United States Patent [19]

Drummond, Jr.

[11] 4,057,666

[45] Nov. 8, 1977

[54] MAGNETIC BRUSH DEVELOPER ROLL FOR ELECTROSTATIC REPRODUCTION MACHINES

[75] Inventor: Arthur Drummond, Jr., Walworth, N.Y.

[73] Assignee: Xerox Corporation, Stamford, Conn.

[21] Appl. No.: 410,835

[22] Filed: Oct. 29, 1973

[51] Int. Cl.[2] .................................................. B32B 7/02

[52] U.S. Cl. ........................................ 428/35; 428/217

[58] Field of Search ................. 51/295, 298.1; 161/42, 161/162, 164, 166, 168

[56] References Cited

U.S. PATENT DOCUMENTS

| | | | |
|---|---|---|---|
| 3,168,387 | 2/1965 | Adams | 51/298.1 UX |
| 3,177,056 | 4/1965 | Höfelmann et al. | 51/295 X |
| 3,502,453 | 3/1970 | Baratto | 51/295 |
| 3,515,625 | 6/1970 | Sedlak et al. | 161/168 X |
| 3,520,666 | 7/1970 | Meyer | 51/295 |
| 3,573,155 | 3/1971 | Mitchell | 161/168 X |
| 3,585,102 | 6/1971 | Burgess | 161/162 |
| 3,778,241 | 12/1973 | Winter et al. | 161/162 X |

*Primary Examiner*—Marion E. McCamish

[57] ABSTRACT

A magnetic brush roller for electrostatic copier or reproduction machines of the type wherein a latent electrostatic image formed on the surface of the machine photoconductor is developed by means of a single or multiple roller magnetic brush apparatus. The outer sleeve of the magnetic brush roller is formed from a non-metallic material, i.e. plastic impregnated with small chip-like pieces of relatively hard material designed to provide the necessary surface roughness.

2 Claims, 5 Drawing Figures

MAGNETIC BRUSH DEVELOPER ROLL FOR ELECTROSTATIC REPRODUCTION MACHINES

This invention relates to an electrostatic reproduction machine, and more particularly to an improved magnetic brush roller, and material composition therefor, for electrostatic reproduction machines.

In electrophotographic processes, a light image of the original being copied is converted into an electrostatic charge pattern on a photoconductive plate. Then, the electrostatic image so formed is developed into a visible image by means of a suitable developer powder, commonly termed toner. One way of effecting this is by use of one or more magnetic brushes. The aforesaid toner is generally comprised of dyed or colored pigmented thermoplastic powders and is intermixed with relatively larger ferro-magnetic carrier particles. The toner itself may be formulated to carry either a negative or positive charge, and is in any case selected vis-a-vis the carrier so that the toner particles acquire the proper operating charge with respect to the latent electrostatic image being developed. Thus, when the developer is brought into operative contact with the charged surface of the photoconductive plate, the greater attractive force of the charged image causes the toner particles to leave the carrier particles and adhere to the image portion of the plate.

The aforesaid magnetic brush roller typically consists of a tube-like member or sleeve, which is rotatably supported. The aforesaid sleeve is preferably made from a non-magnetic material. One or more magnets are mounted inside the sleeve. The aforementioned assembly is disposed so that a portion of the sleeve is immersed in or in contact with a supply of developer which, as alluded to earlier, consists of ferro-magnetic carrier particles and electroscopic toner particles.

As a result, the developer particles are magnetically attracted to the surface of the sleeve and arrange themselves thereupon in the form of a brush. Thus, when the photoconductive member bearing the latent electrostatic image thereon is brought into physical contact with the brush, the attractive force of the electrostatic charge on the plate in the image areas, which is greater than the force holding the toner to the carrier particles, draws the toner from the magnetic brush roller and onto the image areas to render the image visible.

It is well recognized in the art that the developing step as described above is extremely critical. To enhance development, the prior art suggests one magnetic brush roller wherein the external surface of the sleeve is roughened as by cutting grooves, serrations, or knurls, or the like in the surface thereof. Cylinders of this type, however, may suffer from the fact that the number of bristle sites are restricted, and the magnetic brush formed upon the surface thereof may take on the same patterns as that of the grooves or knurls. Another way to provide the desired magnetic brush roller surface is to cover or coat a metal roll substrate, with a layer of particulate material as exemplified by U.S. Pat. No. 3,246,629, issued Apr. 19, 1966 to L. E. Shelffo et al. This system, however, raises the problem of finding a suitable adhesive and process for bonding the particulate coating to a substrate.

In many prior art magnetic brush rollers, the constant rubbing between the surface of the roller and the relatively abrasive developer mix tends to wear and round off the roughened surface points resulting in a relatively smooth roller surface. Smoothing of the magnetic brush roller surface tends however to reduce the brush forming effectiveness of the magnetic brush.

It is therefore a principle object of the present invention to provide a new and improved magnetic brush developer roller for document reproduction machines.

It is an object of the present invention to provide an improved magnet brush roller designed to accommodate wear on the roller surface due to the abrasive action of the developer mix.

It is a further object of the present invention to provide an improved composition and method of manufacture for magnetic brush sleeves.

It is an object of the present invention to provide an improved method of fabricating the outside cylinder of a magnetic brush roller.

It is an object of the present invention to provide an improved composition of material for magnetic brush sleeves.

It is an object of the present invention to provide a magnetic brush roller, the exterior sleeve portion of which is formed from a material composition designed to provide desired surface roughness.

It is an object of the present invention to provide an improved magnetic brush roller construction.

This invention relates to a method of forming a magnetic brush developer sleeve, the steps which include forming the sleeve from a composition of relatively soft base material impregnated with chip-like pieces of a second, relatively hard material, and thereafter errodding the outer surface of the sleeve so formed to wear away a portion of the outside layer of the base material and thereby expose portions of the chip-like pieces to provide a relatively rough exterior surface on the sleeve.

The invention also relates to a magnetic brush sleeve comprising a first, relatively soft non-metallic base material impregnated with chips of a second material and formed into a generally cylindrical configuration, the second material comprising a relatively hard substance.

Other objects and advantages will be apparent from the ensuing description and drawings, in which.

Figure 1:
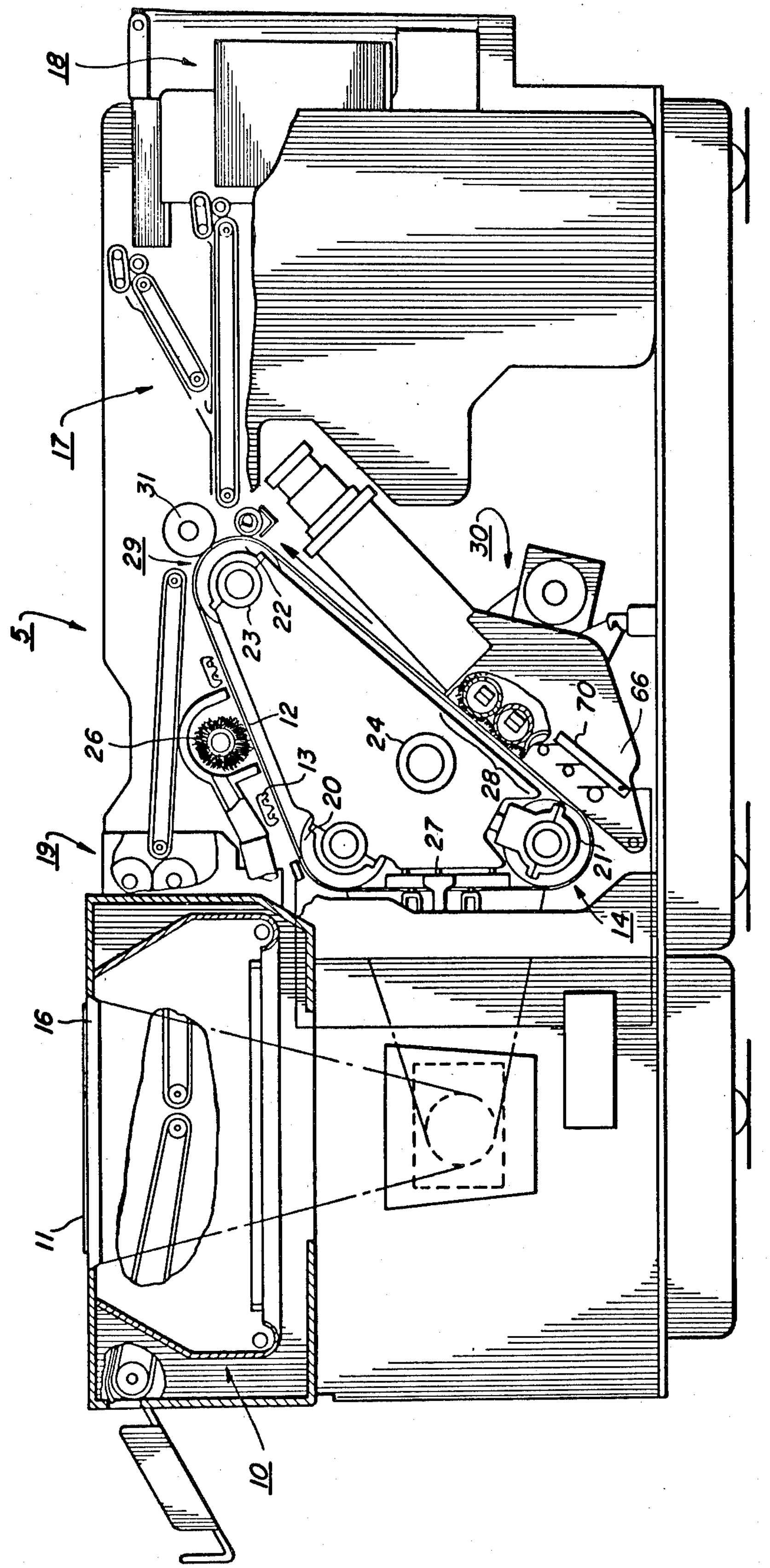
FIG. 1 is a schematic sectional view of an electrostatic reproduction machine incorporating the improved magnetic brush rolls of the present invention.

A typical reproduction or copying machine in which the magnetic brush roller of the present invention is used is illustrated in FIG. 1. There the aforesaid machine is designated generally by the numeral 5.

A document 11 to be copied is placed upon a transparent support platen 16 fixedly arranged in an illumination assembly, generally indicated by the reference numeral 10, positioned at the left end of the machine 5. Light rays from an illumination system are flashed upon the document to produce image rays corresponding to the informational areas. The image rays are projected by means of an optical system onto the photosensitive surface of a xerographic plate in the form of a flexible photoconductive belt 12 arranged on a belt assembly, generally indicated by the reference numeral 14.

The belt 12 comprises a photoconductive layer of selenium which is the light receiving surface and imaging medium for the apparatus, on a conductive backing. The surface of the photoconductive belt is made photosensitive by a previous step of uniformly charging the same by means of a corona generating device or corotron 13.

The belt is journaled for continuous movement upon three rollers 20, 21, and 22 positioned with their axes in parallel. The photoconductive belt assembly 14 is slidably mounted upon two support shafts 23 and 24, with the roller 22 rotatably supported on the shaft 23 which is secured to the frame of the apparatus and is rotatably driven by a suitable motor and drive assembly (not shown) in the direction of the arrow at a constant rate. During exposure of the belt 12, the reflected light image of such original document positioned on the platen is flashed on the surface of the belt to produce an electrostatic latent image thereon at exposure station 27.

As the belt surface continues its movement, the electrostatic image passes through a developing station 28 in which there is positioned a magnetic brush developing apparatus, generally indicated by the reference numeral 30, and which provides development of the electrostatic image by means of multiple brushes as the same moves through the development zone, as more fully hereinafter described.

The developed electrostatic image is transported by the belt to a transfer station 29 whereat a sheet of copy paper or transfer member is moved between a transfer roller 31 and the belt at a speed in synchronism with the moving belt in order to accomplish transfer of the developed image solely by an electrical bias on the transfer roller. There is provided at this station a sheet transport mechanism, generally indicated at 17, adapted to transport sheets of paper from a paper handling mechanism, generally indicated by the reference numeral 18, to the developed image on the belt at the station 29.

After the sheet is stripped from the belt 12, it is conveyed into a fuser assembly, generally indicated by the reference numeral 19, wherein the developed and transferred xerographic powder image on the sheet material is permanently affixed thereto. After fusing, the finished copy is discharged from the apparatus at a suitable point for collection externally of the apparatus. The toner particles remaining as residue of the developed image, background particles, and those particles otherwise not transferred are carried by the belt 12 to a cleaning apparatus 26 positioned on the rim of the belt between rollers 20 and 22 adjacent a charge device 25. Further details regarding the structure of the belt assembly 14 and its relationship with the machine and support therefor may be found in U.S. Pat. No. 3,730,623, assigned to the same assignee.

Figure 3:
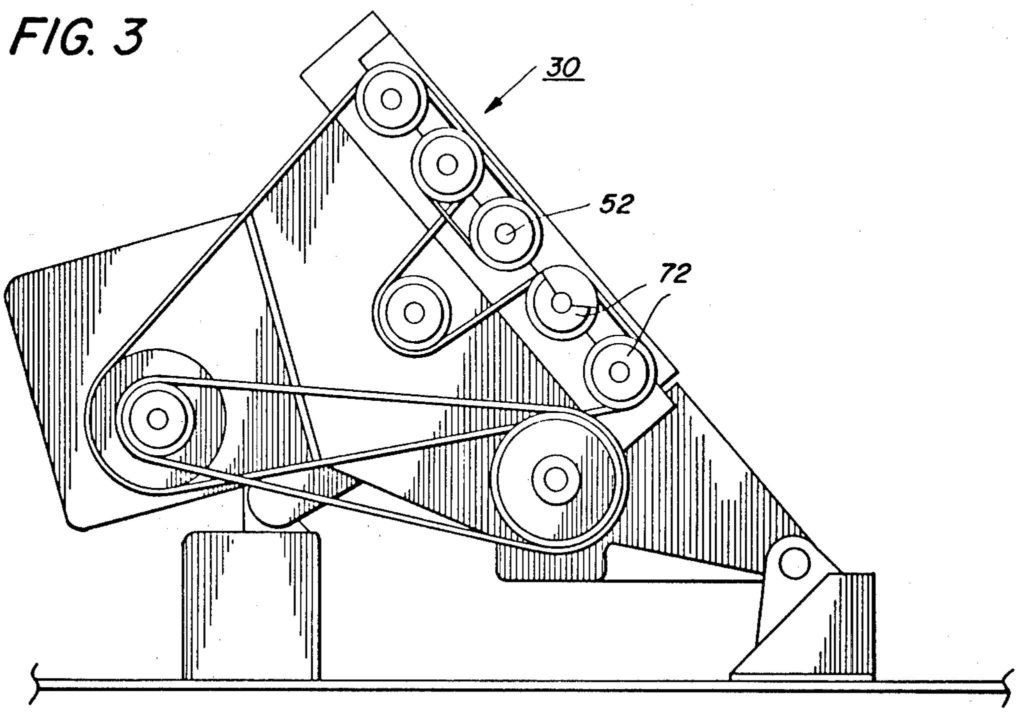
FIG. 3 is an elevational view of the opposite of the magnetic brush developing assembly shown in FIG. 2.
Figure 2:
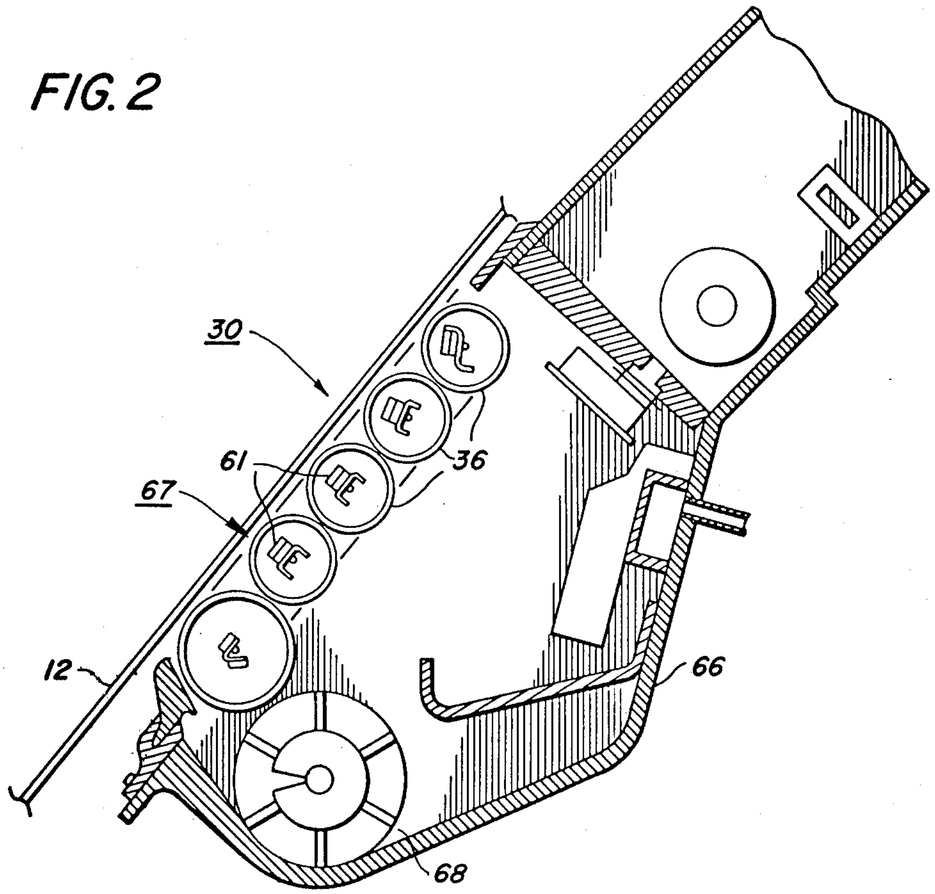
FIG. 2 is a side view of the magnetic brush developing apparatus for the reproduction machine shown in FIG. 1.
Figure 4:
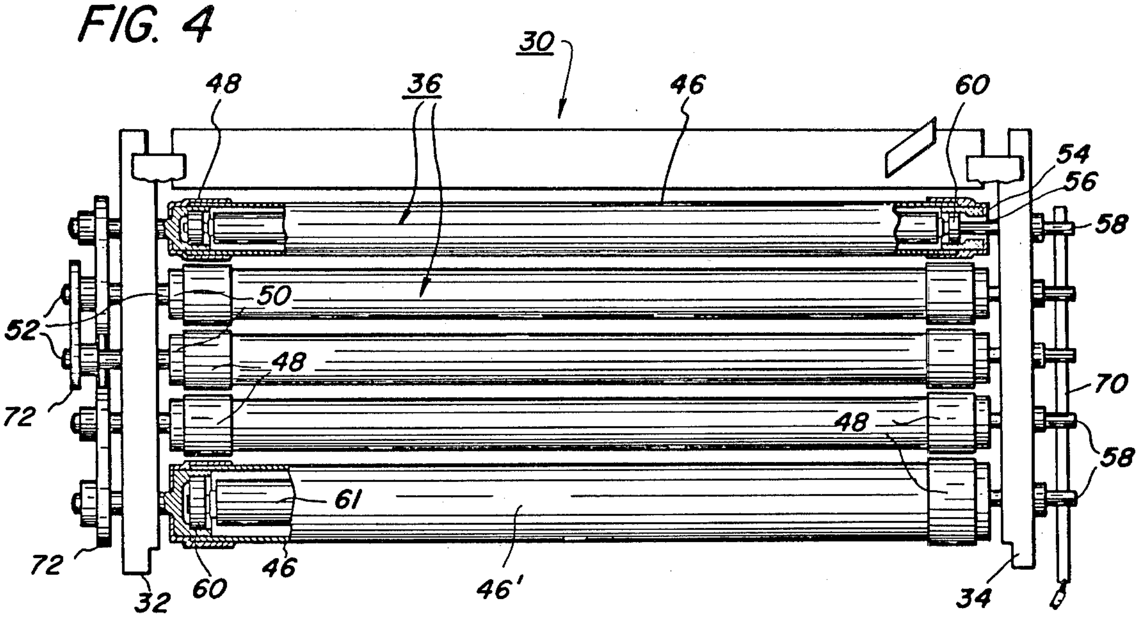
FIG. 4 is a top plane view of the magnetic brush assembly showing details of the magnetic brush roller supporting means.

Referring to FIGS. 2 through 4, there is illustrated the magnetic brush developing assembly of reproduction machine 5. Developing assembly 30 comprises a series of magnetic brush rollers 36 rotatably supported in frame end plates 32, 34. The individual rollers 36 are hollow cylinders or sleeves 46 presenting a roughened exterior surface 46' and, as will appear more fully hereinafter, are formed of a non-magnetizable material. Sleeves 46 are of a length sufficient to extend almost the width of the developer housing 66. End sleeves 48, formed of an insulating material, are shrunk fit on the sleeves 46 adjacent the ends thereof. One end of each sleeve 46 is closed by a cap 50 which supports a roller drive shaft 52 in coaxial alignment with the sleeve 46. The other end of the sleeve 46 is closed by a cap 54 having an orifice 56 through which extends shaft 58 of the internal bar magnets 61. Suitable bearing means 60 are provided to permit the sleeve 46 to rotate relative to shaft 58.

The roller drive shafts 52 are suitably mounted in bearings in end plate 32 and carry on their projecting ends drive sprockets 72. Sprockets 72 are formed of an insulating material.

Referring specifically to FIGS. 2 and 3, the developing assembly 30 is disposed within a housing, generally indicated as 66, having a generally rectangular cross section and a length extending beyond the width of the photoconductive belt 12. Housing 66 is substantially closed except for an opening 67 opposite photoconductive belt 12 whereat development of the latent image on belt 12 is effected. Housing 66 in effect serves as a container for a suitable developing material which comprises carrier beads formed from magnetizable material and colored electrostatic toner particles which electrostatically adhere thereto.

To enhance magnetic brush operation, the magnetic brush rollers 36 are electrically biased. For this purpose a suitable wiper 70 is provided in electrical contact with magnet shafts 58, wiper 70 extending along and being supported by side plate 34 to form an electrical path from a suitable source (not shown) to each of the magnetic brush rollers 36. During development, the rollers 36 are rotated in unison in the same direction from a suitable drive source via sprockets 72, the internal bar magnets 61 remaining stationary. The brush bristles produced by the influence of the magnetic field emanating from the bar magnets 61 acting upon the magnetizable carrier beads in the developing material will form on the upper region of the magnetic brush rollers 36 adjacent the undersurface of the selenium belt 12.

This takes the form of the "magnetic blanket" extending continuously from one brush roller 36 to another for the entire width of the development zone 28 wherein the material is disposed or available to some degree for developing purposes. Further details regarding the formation and effect of the "magnetic blanket" are described in the co-pending application Ser. No. 330,285, assigned to the same assignee now U.S. Pat. No. 3,640,248 issued Feb. 8, 1972.

Figure 5:
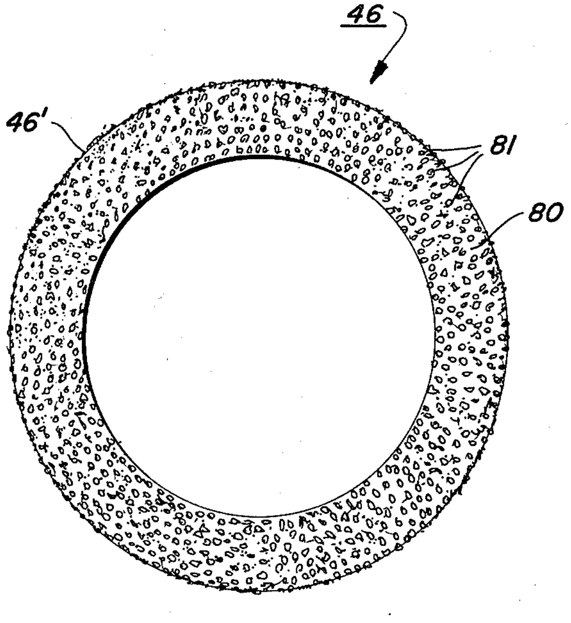
FIG. 5 is an enlarged, cross-sectional view of a magnetic brush roller of the present invention.

As best seen in FIG. 5, the magnetic brush cylinders 46 are formed from a suitable base material 80 such as plastic, glass, rubber, ceramic, or the like, impregnated with chip-like pieces 81 of a relatively hard material such as tungsten carbide, sand, glass, silicone carbide, non-ferrous metals, or the like. According to a preferred method of manufacture, chips 81 are disposed within the base material 80 while the material is still in the liquid or semi-liquid state and before hardening or setting thereof to form a moldable mixture. The mixture may be then fed or forced into the cavity of a suitable mold (not shown) to fill the same, it being understood that the mold cavity conforms, both in outline and dimension, to the cylinder-like configuration desired. Following setting or curing of the mixture, the mold is opened and the completed cylinder removed.

To provide initial roughness to the exterior of the newly molded magnetic brush sleeve 46 following removal from the mold, and to enhance the magnetic brush forming properties thereof, the exterior surface of the newly molded sleeve 46 is subjected to light abrasive blasting as, for example, sand blasting. This action errodes or wears away portions of the relatively softer base material 80 to expose the chip-like pieces adjoining the periphery of sleeve 46.

To assure a degree of electrical conductivity sufficient to permit an effective electrical bias to be placed on the magnetic brush rollers 36 as described earlier, the base material 80 should be electrically conductive. Where the base material is electrically non-conductive or of very low conductivity, a conductive filler such as carbon, graphite, metal, or the like may be added to the base material 80 to provide or enhance electrical conductivity of the roller. Alternately, the surface of a finished roller 36 may be plated with a suitable metal such as stainless steel.

The aforedescribed base material 80 forms the relatively rigid binding material retaining the harder chip-like pieces 81 in cylindrical configuration. The pieces 81 provide a magnetic brush roller with the relatively rough exterior surface necessary to facilitate adherence of the developer thereto. During use, the relative movement between the magnetic brush roller 36 and the developing material tends, due to the abrasive nature of the developing material, to wear away the surface of roller 36, particularly the relatively softer base material 80. However, despite such wear, the working surface of roller 36 remains rough. Any of the chip-like pieces 81 or particles therefrom that come loose from the base material 80 during use of magnetic brush roller 36 drop into the sump 68 of developer 66 and there remain harmlessly until removed, normally when the developer mix is changed. Similarly, such base material as may errode or wear away from the roller 36 is similarly caught in the sump 68 until a change in developer mix is made.

While the magnetic brush sleeve 46 has been illustrated and described herein as being cylindrical, it will be understood that the exterior surface of sleeve 46 may consist of flat surface sections. For example, sleeve 46 may be octagonal in cross section. Alternately, sleeve 46 may instead comprise a flexible belt.

While the invention has been described with reference to the structure disclosed, it is not confined to the details set forth, but is intended to cover such modifications or changes as may come within the scope of the following claims.

What is claimed is:

1. A sleeve like part for use as a magnetic brush developer comprising a first base material impregnated with particles of a second material, to form a rigid part, said second material being harder than said first base material whereby the wear resistance of said second material is greater than the wear resistance of said first base material, and a third electrically conductive filler material to promote electrical conductivity of said part.

2. The magnetic brush sleeve according to claim 1, including a filler material to promote electrical conductivity chosen from the group consisting of carbon, graphite and nonferrous metals.

* * * * *